Jan. 11, 1955
E. W. DAVIS
2,699,271
CONTROL VALVE FOR LUBRICATING APPARATUS
Filed Aug. 19, 1949
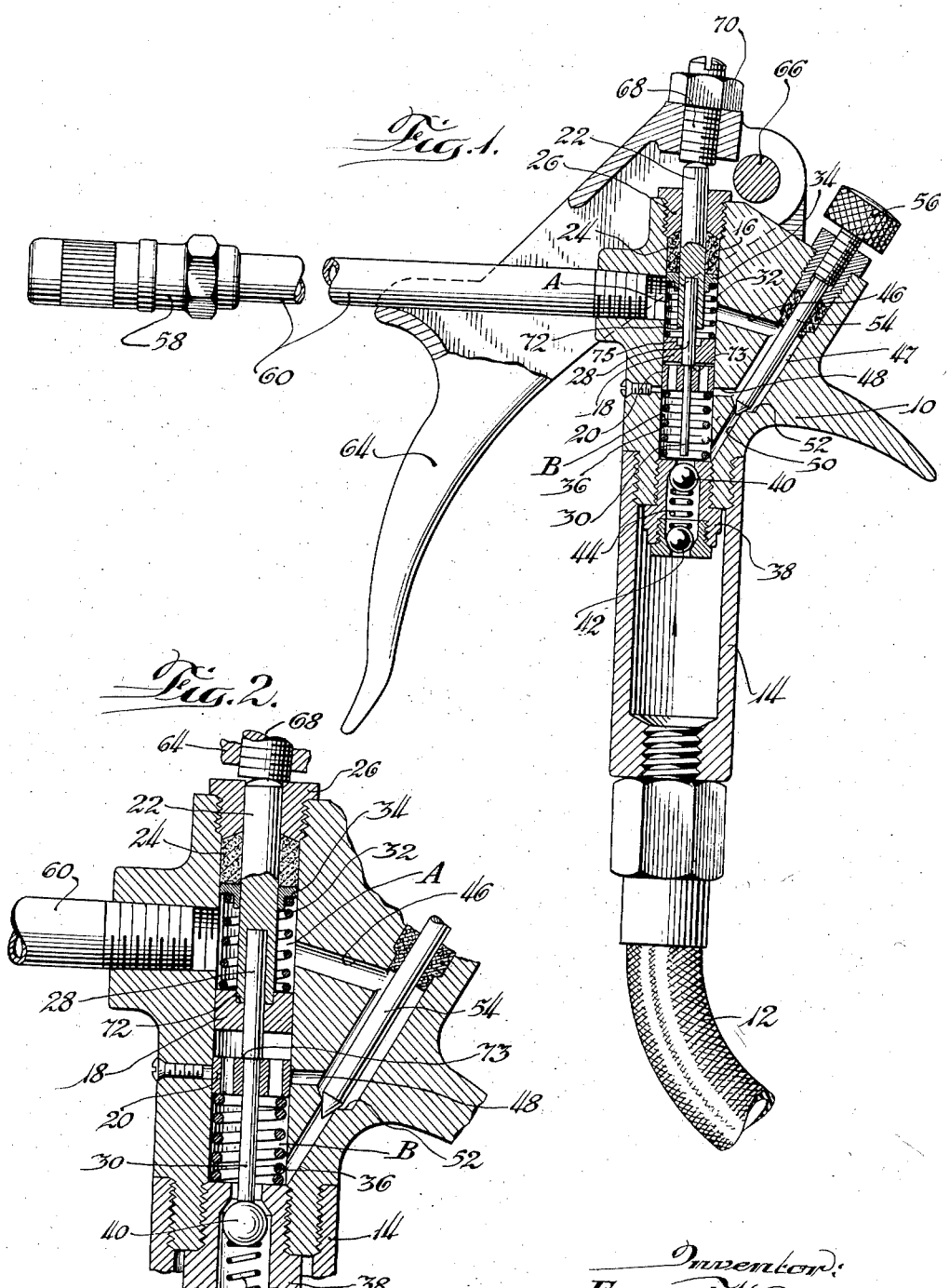
Inventor:
Ernest W. Davis
By Hinkle, Horton, Ahlberg, Hausmann & Kupper
Attorneys.

2,699,271

CONTROL VALVE FOR LUBRICATING APPARATUS

Ernest W. Davis, Oak Park, Ill.

Application August 19, 1949, Serial No. 111,231

9 Claims. (Cl. 222—335)

My invention relates generally to lubricating apparatus and more particularly to control valves used for the control of discharge of lubricant from a high pressure source to a part to receive lubricant.

In the application of lubricant to parts requiring a supply, it is frequently desirable that the quantity of lubricant supplied be not excessive and it is, therefore, desirable to use a manually operated control valve by which the quantity of lubricant discharged may be accurately gauged.

Furthermore, in high pressure lubricating systems in which the discharge control valve is successively coupled to lubricant receiving fittings, it is desirable that the pressure at the coupler be relieved after sufficient lubricant has been supplied to the fitting so that the disconnection of the coupler from the fitting is facilitated.

It is, therefore, an object of my invention to provide an improved lubricant supply control valve by which lubricant may be discharged in predetermined quantities, and in which the lubricant pressure at the coupler is relieved upon completion of the discharge.

It is a further object of my invention to provide an improved control valve for pressure lubricating apparatus which is simple in construction, is easily operated, will discharge the lubricant in measured quantities and which may be economically manufactured.

Other objects will appear from the following description, reference being had to the accompanying drawings, in which:

Fig. 1 is a central vertical sectional view of the improved control valve; and

Fig. 2 is an enlarged fragmentary sectional view showing some of the parts in operated position.

The control valve comprises a body casting 10 which is adapted to be connected to a source of lubricant under pressure by a conduit 12 through a pipe handle 14 which is threaded to the body 10. The body 10 has a bore 16 for a piston 18 and an apertured slide valve 20. A plunger 22 extends through a packing 24 in the bore 16, the packing being held in place by a packing gland 26 threaded in the upper end of the bore 16. The upper end of the plunger 22 which projects through the packing gland 26 is of relatively large diameter and has secured thereto a portion 28 of intermediate diameter and a portion 30 of small diameter. These portions of the plunger 22 may be formed integrally or, as shown, the portions 28 and 30 may be formed as a unit and secured to the portion 22.

A relatively weak spring 32 is compressed between the piston 18 and a guiding washer 34, while the slide valve 20 is held in the position shown in Fig. 1 by a relatively strong coil spring 36 which is seated upon an opposed check valve cage 38 threaded into the lower end of the bore 16. This cage includes a check valve 40 opening in the direction opposite to that of lubricant flow and a check valve 42 opening in the direction of flow, these check valves being held against their seats by a spring 44 compressed between them.

The piston 18 divides the bore 16 into an upper cylinder A and a lower cylinder B which are normally in communication with one another through passageways 46, 47 and 48. The passageway 47 has an extension 50 of reduced diameter to provide a seat 52 for a suitably packed needle valve 54 provided with a knurled operating knob 56. The upper cylinder A is connected to a coupler 58 by a suitable pipe conduit 60, the coupler being adapted to make connection successively with a plurality of lubricant receiving fittings attached to bearings or other parts to be lubricated.

An operating handle 64 is pivoted upon a stud 66 fixed to the body casting 10 and has an adjustable screw 68 threaded therein for engagement with the projecting end of the plunger 22, the screw being adapted to be locked in adjusted position by nut 70. Due to the construction of the plungers in portions of three different diameters, there are provided shoulders 72 and 73, the shoulder 72 operating as a stop to limit upward movement of the piston 18, while the shoulder 73 acts as a stop to limit upward movement of the slide valve 20 with respect to the plunger.

In operation, assuming all of the spaces within the control valve to be filled with lubricant and the coupler 58 connected to a suitable lubricant receiving fitting, initial movement of the handle 64 toward the handle 14 will cause a large portion of the plunger 22 to enter the upper cylinder A and this will displace lubricant from the cylinder; and since the check valve 42 prevents return of any lubricant to the source of supply, a small quantity of lubricant will be discharged from the coupler 58. This discharge is of a very small quantity of lubricant and continues only until the slide valve is moved inwardly sufficiently to cover the end of the passageway 48. At approximately this time the small diameter portion 30 of the plunger engages and opens the check valve 40 whereupon the lubricant under pressure from the conduit 12 will flow past the check valves 42 and 40 and through the apertures in slide valve 20, and force the piston 18 upwardly against the force of the spring 32 until it is arrested by the shoulder 72 as shown in Fig. 2. Since the upper cylinder A has its communication with the lower cylinder B cut off by the slide valve 20, this upward movement of the piston 18 will effect a discharge of lubricant from the upper cylinder A to the part to be lubricated. A measured charge of lubricant is thus supplied to the part to be lubricated.

When my improved control valve is utilized in the lubrication of a bearing offering only nominal resistance to inflow of lubricant, opening of check valve 40 by the plunger with resultant rush of lubricant into cylinder B and against piston 18 would cause this piston to engage shoulder 72 with considerable force and produce a shock reaction in handle 64 which might tend to make the operator's hand sore. I, therefore, preferably provide a dashpot to reduce the violence of engagement of the piston 18 with the shoulder 72. This dashpot is formed by the cooperation of the annular shoulder 72 with an annular groove or recess 75 in the upper end of the piston 18. This recess is normally filled with grease and the shoulder 72 fits relatively freely in this recess in such manner that the grease is squeezed from the recess as the piston and shoulder engage, the exit of the grease from the recess serving to cushion the engagement of the piston with the shoulder.

Upon release of the handle 64, the spring 36, being stronger than the spring 32, will force the slide valve 20 and plunger 22 upwardly, returning the handle 64 to the position in which it is shown in Fig. 1. As the slide valve 20 moves upwardly, the lubricant confined between the upper surface of the slide valve 20 and the lower surface of the piston 18 will be transferred through the apertures in the slide valve to the place beneath the slide valve 20 after the slide valve has uncovered the passageway 48.

This is accomplished by the expansion of the spring 32 acting on piston 18 whereby lubricant is transferred from the cylinder B to the cylinder A through the passageway comprising the ducts 48, 47 and 46. This transfer does not result in the discharge of any lubricant from the cylinder A since the movement of the piston 18 in the bore 16 does not change the aggregate effect of volume of the cylinders A and B. However, outward movement of the plunger 22 results in the effect of enlargement of the cylinder A and thus will cause the pressure therein to be reduced. This reduction in pressure will be communicated to the coupler 58 and will permit it to be disengaged readily from the lubricant receiving fitting, it being understood that the coupler 58 is of the type shown in the patent to Bystricky, No. 2,016,809, in which the coupler is clamped to the fitting by mechanism operated by lubricant pressure.

If it is desired to supply lubricant continuously, as when a container is to be filled, the needle valve 56 may be opened and the handle 64 operated to open the check valve 40 whereupon lubricant may flow continuously past the two check valves 42, 40, through cylinder B, passageways 50, 47 and 46 to cylinder A from which it is discharged through the pipe conduit 60 and coupler 58 to the container.

Another feature of my invention lies in the provision of means whereby the pressure of the lubricant reaching the control valve from the source of supply may be increased when a bearing is encountered whose resistance to inflow of lubricant is greater than can be overcome by the pressure at the supply source. In lubricating a bearing offering only the usual resistance to inflow of lubricant, opening of the check valve 40 by the plunger is accomplished by an inrush of lubricant to the cylinder B which raises the piston 18 and displaces a predetermined quantity of lubricant from the cylinder A through discharge pipe 60 and coupler 58 to the bearing. However, where the resistance of the bearing is greater than can be overcome by the pressure of the lubricant from the supply source, no such inrush of lubricant occurs when the check valve 40 is opened by the plunger where the cylinders A and B and connecting passages are filled with lubricant as is ordinarily the case.

Under these conditions the piston 18 remains substantially in the position shown in Fig. 1 when the check valve 40 is opened. Continued downward movement of the plunger, however, reduces the effective volumes of both cylinders A and B; and, since no lubricant can flow past check valve 42, this decrease in the effective volumes of the cylinders increases the pressure on the lubricant therein and in the discharge pipe 60 and coupler 58. Since piston 18 and slide valve 20 prevent flow of lubricant from cylinder B to cylinder A, the decrease in effective volume of cylinder B through downward movement of the plunger is compensated for by a corresponding upward movement of the piston 18 which automatically changes its position to balance the lubricant pressures in cylinders A and B. This movement of the plunger to increase lubricant pressure is ordinarily effective to force lubricant into any bearing that may be encountered in the operation of control valves of this type and can continue until the shoulder 72 of the plunger comes into firm engagement with the piston 18.

It is to be understood that couplers, like the coupler 58, are ordinarily applied to lubricant receiving fittings or nipples having check valves adjacent their inlet ends to permit inflow of lubricant but preventing return flow therefrom. Accordingly, if the increased pressure built up by one forward movement of the plunger is insufficient to open up a bearing of high resistance, this pressure increasing operation may be repeated by releasing the handle 64 until check valve 40 closes and then again applying pressure on the handle 64 to produce another downward and pressure increasing stroke of the plunger. By thus alternately releasing and then increasing manual pressure on the handle 64, repeated discharges of lubricant under increased pressure can be effected; and, because of the check valve in the lubricant receiving fittings, such increases in pressure become additive so that a total pressure at the bearing can be built up which greatly exceeds the pressure produced by any one pressure increasing stroke of the plunger.

From the foregoing description of a preferred embodiment of my invention, it will be apparent that my novel control valve can be operated in any of the following ways: (1) to supply a measured shot of lubricant; (2) to supply a continuous flow of lubricant; and (3) to supply lubricant at pressures greatly exceeding the pressure at which the lubricant is supplied to the control valve. This control valve can accordingly be operated to accomplish a variety of results and is adapted to meet all the needs of an operator handling such a control valve.

While I have illustrated and described only a single embodiment of my invention, it is to be understood that my invention is not limited to the particular form shown but may assume numerous other forms and includes all modifications, variations and equivalents within the scope of the appended claims.

I claim:
1. In a hand operated control valve for lubricating systems, the combination of a body having a cylinder, a manually operated plunger slidably mounted in the body and projecting from one end of the cylinder and having portions within the cylinder of intermediate and small diameters to provide upper and lower shoulders, a handle for operating the plunger, a piston slidable in the cylinder on the plunger portion of intermediate diameter, the piston dividing the cylinder into inlet and outlet portions, an inlet and an outlet to communicate respectively with the inlet and outlet portions, an apertured slide valve in the cylinder on the plunger portion of small diameter, a pair of opposed check valves normally closing the inlet of the cylinder, one of said check valves opening in a direction opposite to the direction of flow of lubricant into the cylinder and positioned to be engaged by the end of the small diameter portion of the plunger when the latter is moved inwardly substantially to its maximum extent, a relatively weak spring positioned to press the piston downwardly away from the upper shoulder, a stronger spring pressing the slide valve against the lower shoulder of the plunger, said body providing a passageway connecting the inlet portion of the cylinder to the outlet portion, said slide valve closing one end of the passageway when the plunger is moved into the cylinder to substantially its maximum position and being moved by its spring to uncover the end of the passageway when the plunger is withdrawn to its normal position, whereby the piston may be moved by its spring to transfer lubricant from the inlet portion of the cylinder to the outlet portion of the cylinder, said body providing a second passage connecting said portion of the cylinder, and another valve controlling the second passage.

2. In a hand operated control valve for lubricating systems, the combination of a body having a cylinder, a manually operated plunger slidably mounted in the body and projecting from one end of the cylinder and having portions within the cylinder of intermediate and small diameters to provide upper and lower shoulders, a piston slidable in the cylinder on the plunger portion of intermediate diameter, the piston dividing the cylinder into inlet and outlet portions, an inlet and an outlet to communicate respectively with the inlet and outlet portions, an apertured slide valve in the inlet cylinder on the plunger portion of small diameter, a pair of opposed check valves normally closing the inlet of the cylinder, one of said check valves opening in a direction opposite to the direction of flow of lubricant into the cylinder and positioned to be engaged by the end of the small diameter portion of the plunger when the latter is moved inwardly substantially to its maximum extent, a relatively weak spring positioned to press the piston downwardly away from the upper shoulder, and a stronger spring pressing the slide valve against the lower shoulder of the plunger, said body providing a passageway connecting the inlet portion to the outlet portion, said slide valve closing one end of the passageway when the plunger is moved into the cylinder to substantially its maximum position and being moved by its spring to uncover the end of the passageway when the plunger is withdrawn to its normal position, whereby the piston may be moved by the relatively weaker spring to transfer lubricant from the inlet portion of the cylinder to the outlet portion.

3. In a control valve for delivering measured charges of lubricant, the combination of means providing a cylindrical measuring chamber, a piston reciprocable in the measuring chamber, an outlet tube, means connecting the tube directly with the measuring chamber adjacent one end, a spring urging the piston away from the outlet end of the chamber, means providing an opening communicating with the chamber adjacent its opposite end, an inlet conduit, a normally closed inlet valve connected between the inlet conduit and the opening, means providing a bypass passage communicating with the outlet conduit for connecting the outlet conduit with the opening, a bypass valve controlling communication through the bypass conduit, and means for alternately opening the inlet valve and the bypass valve.

4. In a control valve for selectively delivering measured charges or a continuous flow of lubricant, the combination of means providing a measuring chamber, a piston reciprocable in the measuring chamber, an outlet conduit connected with the measuring chamber adjacent one end, a spring urging the piston away from the outlet end of the chamber, means providing an opening communicating with the chamber adjacent its opposite end, an inlet conduit, a normally closed inlet valve connected between the inlet conduit and the opening, means providing a bypass passage for connecting the opening with the outlet conduit, a bypass valve controlling communication through the bypass passage, means for alternately opening the inlet valve and the bypass valve, separate conduit means for connecting the opening with the outlet conduit to provide continuous flow when the inlet valve is opened, and separate valve means for controlling communication through the separate conduit means.

5. In a control valve for delivering measured charges of lubricant, the combination of means providing a cylindrical chamber, an outlet conduit communicating with the chamber adjacent one end, an inlet conduit communicating with the chamber at the opposite end through an axial inlet port, inlet valve means for normally closing the inlet port including a valve plug in the inlet conduit, a slidable plunger extending axially into the chamber at the outlet end and terminating adjacent the valve plug, a piston slidable in the chamber and on the plunger to divide the chamber into inlet and outlet portions, means for moving the plunger inwardly to open the inlet valve means for admitting lubricant to force the piston toward the outlet end of the chamber, stop means for limiting movement of the piston toward the outlet end, bypass conduit means extending from the outlet portion of the chamber and communicating with the inlet portion through a lateral bypass port, an apertured slide valve slidable in the inlet portion of the chamber, means for carrying the slide valve along with the plunger toward the inlet port to close the bypass port when the inlet valve means is opened, and spring means for returning the slide valve and the plunger to close the inlet valve means and open the bypass port and for urging the piston away from the outlet end of the chamber to force lubricant through the bypass conduit means when the bypass port is opened.

6. In a control valve for delivering measured charges of lubricant, the combination of means providing a cylindrical chamber, an outlet conduit communicating with the chamber adjacent one end, an inlet conduit communicating with the chamber at the opposite end through an axial inlet port, inlet valve means for normally closing the inlet port including a valve plug in the inlet conduit, a slidable plunger extending axially into the chamber at the outlet end and terminating adjacent the valve plug, a piston slidable in the chamber and on the plunger to divide the chamber into inlet and outlet portions, means for moving the plunger inwardly to open the inlet valve means for admitting lubricant to force the piston toward the outlet end of the chamber, stop means on the plunger for limiting movement of the piston toward the outlet end, bypass conduit means extending from the outlet portion of the chamber and communicating with the inlet portion through a lateral bypass port, an apertured slide valve slidable in the inlet portion of the chamber, a relatively strong spring urging the slide valve toward the piston for uncovering the bypass port, means for carrying the slide valve along with the plunger toward the inlet port to close the bypass port when the inlet valve means is opened, and a relatively weaker spring urging the piston toward the slide valve to force lubricant through the bypass conduit means when the bypass port is open.

7. In a control valve for lubricating systems, the combination of means having a passage therethrough, the passage including a cylindrical bore, a movable charge ejecting piston dividing the bore into two portions, an outlet from one portion and an inlet into the other portion, normally closed valve means for controlling lubricant flow through the inlet, the piston being movable toward the outlet upon flow of lubricant through the inlet to eject lubricant from the bore, means providing a bypass passage connecting the two portions of the bore, a slide valve in the bore for controlling communication through the bypass passage, and means for operating the valve means and the slide valve for alternately opening the valve means and the bypass passage.

8. In a control valve for lubricating systems, the combination of means having a passage therethrough, the passage including a cylindrical bore, a charge ejecting piston dividing the bore into two portions, an outlet from one portion and an inlet into the other portion, normally closed valve means for controlling lubricant flow through the inlet, the piston being movable toward the outlet upon flow of lubricant through the inlet to eject lubricant from the bore, means providing a bypass passage connecting the two portions of the bore, a slide valve in the bore for controlling communication through the bypass passage, means for operating the valve means and the slide valve for alternately opening the valve means and the bypass passage, means forming a passage for bypassing the slide valve and the piston to provide continuous flow when the valve means is opened, and separate valve means for controlling communication through the last mentioned passage.

9. In a control valve for lubricating systems, the combination of means having a passage therethrough, the passage including a cylindrical bore, a charge ejecting piston dividing the bore into two portions, the piston being movable in one direction by lubricant pressure, a spring for moving the piston in the opposite direction, normally closed valve means for controlling communication through the passage, means providing a bypass passage connecting the two portions of the bore, a slide valve in the bore for controlling communication through the bypass passage, and a plunger extending slidably into the bore for operating the valve means and the slide valve for alternately opening the valve means and the bypass passage.

References Cited in the file of this patent

UNITED STATES PATENTS

| Number | Name | Date |
|---|---|---|
| 1,686,309 | Zabriskie | Oct. 2, 1928 |
| 1,764,823 | Bowlus | June 17, 1930 |
| 1,819,381 | Palmer | Aug. 18, 1931 |
| 1,995,377 | Creveling | Mar. 26, 1935 |
| 2,016,809 | Bystricky | Oct. 8, 1935 |
| 2,042,970 | Thomas | June 2, 1936 |
| 2,056,250 | Bystricky | Oct. 6, 1936 |
| 2,546,258 | Farrell | Mar. 27, 1951 |